United States Patent [19]
Benedict

[11] 4,223,204
[45] Sep. 16, 1980

[54] MACHINE FOR MARKING BAKED GOODS

[76] Inventor: Melvin A. Benedict, 4185 Ivanhoe Dr., Monroeville, Pa. 15146

[21] Appl. No.: 934,467

[22] Filed: Aug. 17, 1978

[51] Int. Cl.² .............................................. H05B 1/00
[52] U.S. Cl. .................................... 219/243; 101/9; 101/27
[58] Field of Search .................. 219/243; 101/9, 27, 101/31; 156/583.7, 583.9, 583.1

[56] References Cited

U.S. PATENT DOCUMENTS

| | | | |
|---|---|---|---|
| 709,602 | 9/1902 | Jenkins et al. | 101/31 |
| 1,733,876 | 10/1929 | Halvorsen et al. | 101/9 X |
| 1,898,782 | 2/1933 | Littlefield | 101/27 X |
| 2,047,373 | 7/1936 | Kingsley | 101/9 |
| 3,323,569 | 6/1967 | Benischek | 101/27 |
| 3,348,474 | 10/1967 | Virta et al. | 219/243 X |
| 3,743,566 | 7/1973 | Louthan et al. | 156/583.7 X |
| 4,004,503 | 1/1977 | Dwyer | 156/583.9 X |

*Primary Examiner*—C. L. Albritton
*Attorney, Agent, or Firm*—Robert D. Yeager

[57] ABSTRACT

A bun marking machine is disclosed in which a formed heating member is brought into contact with a baked bun for marking the top of the baked bun with a distinctive pattern. The heated member in the disclosed bun marking machine is an electrically heated element supported in a detachable head. The heating element is formed into a selected shape and sheet metal bun branding patterns are attached thereto. During operation the element gets very hot and also heats the marking pattern hot enough to mark a baked bun when brought in contact therewith. Various detachable heads are provided having different marking patterns formed thereon. A bun holding slide is provided for holding and positioning the bun beneath the heated pattern. The detachable heating element head is attached to a support arm assembly which extends from the vertical portion of a support frame. The support arm includes a movable rod having the heating element connected for movement therewith which can be lowered so that the heated branding pattern contacts the bun and, after a selected period of time, forms a distinctive pattern thereon. When the movable portion of the support arm is lowered it activates a limit switch which starts a timer. After a set period of time has elapsed, the timer, through appropriate electrical interfaces, sets off a buzzer to indicate that the selected period of time has elapsed. The variable timer can be set to a desired time.

4 Claims, 19 Drawing Figures

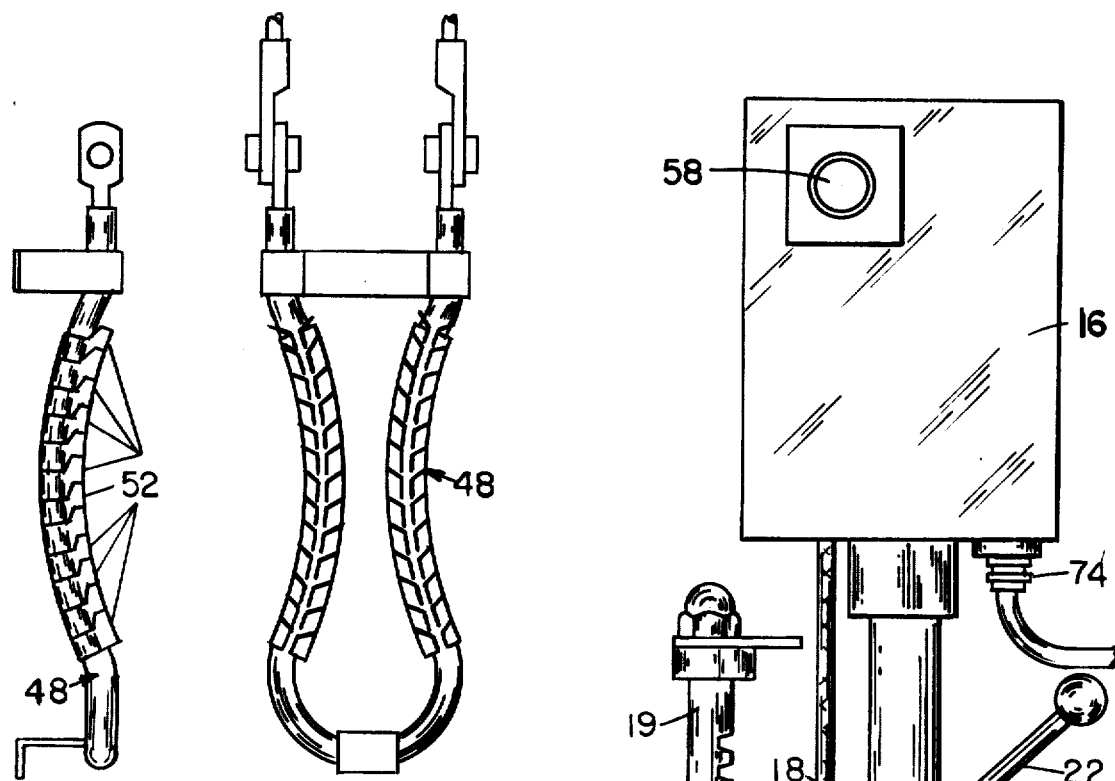
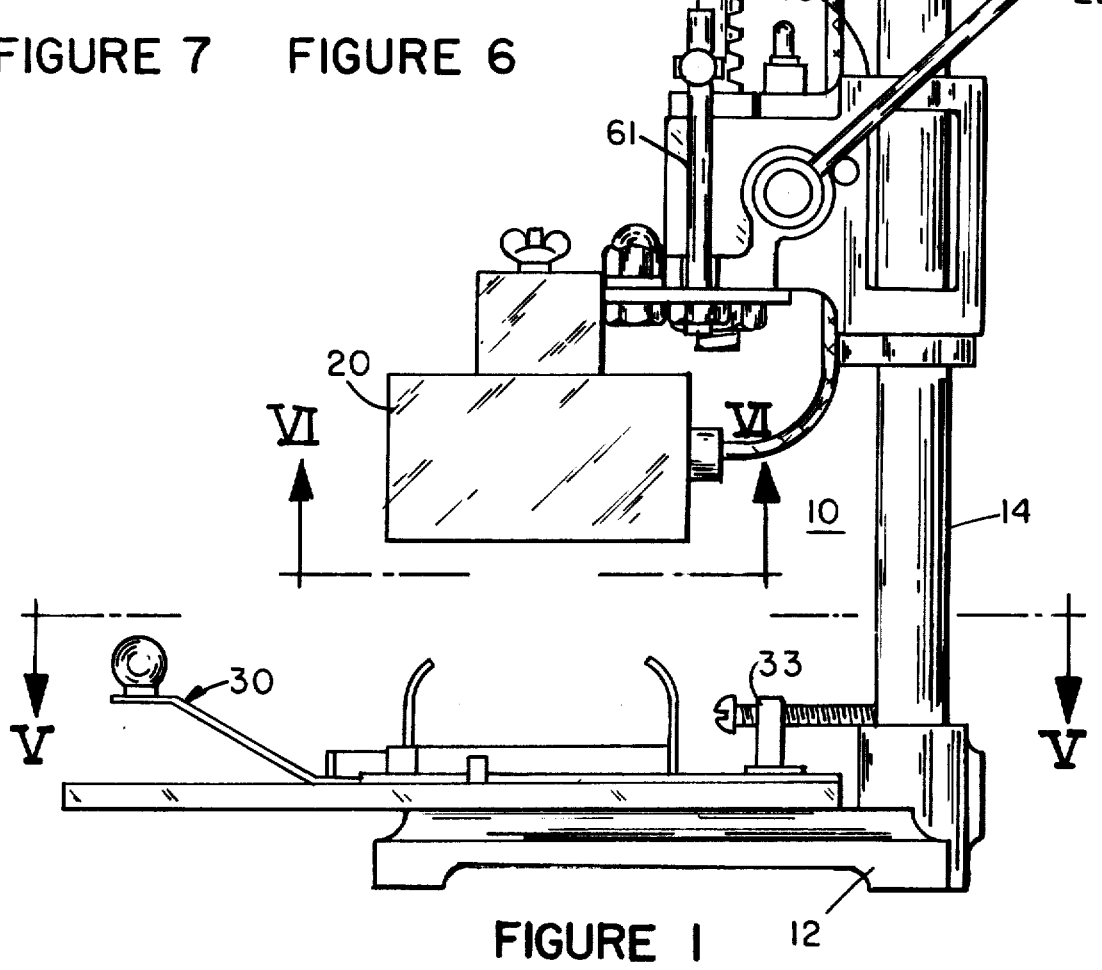
FIGURE 7   FIGURE 6
FIGURE 1

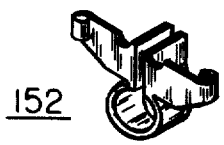
FIGURE 18
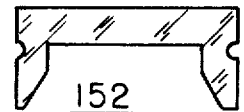
FIGURE 19
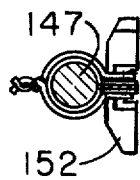
FIGURE 17
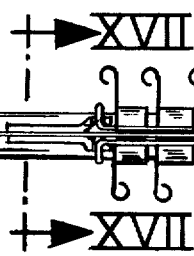
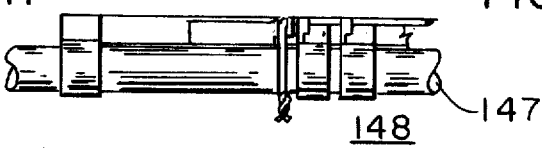
FIGURE 15
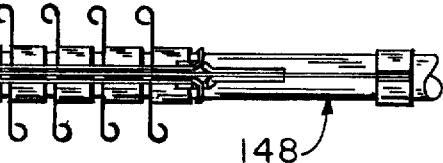
FIGURE 16
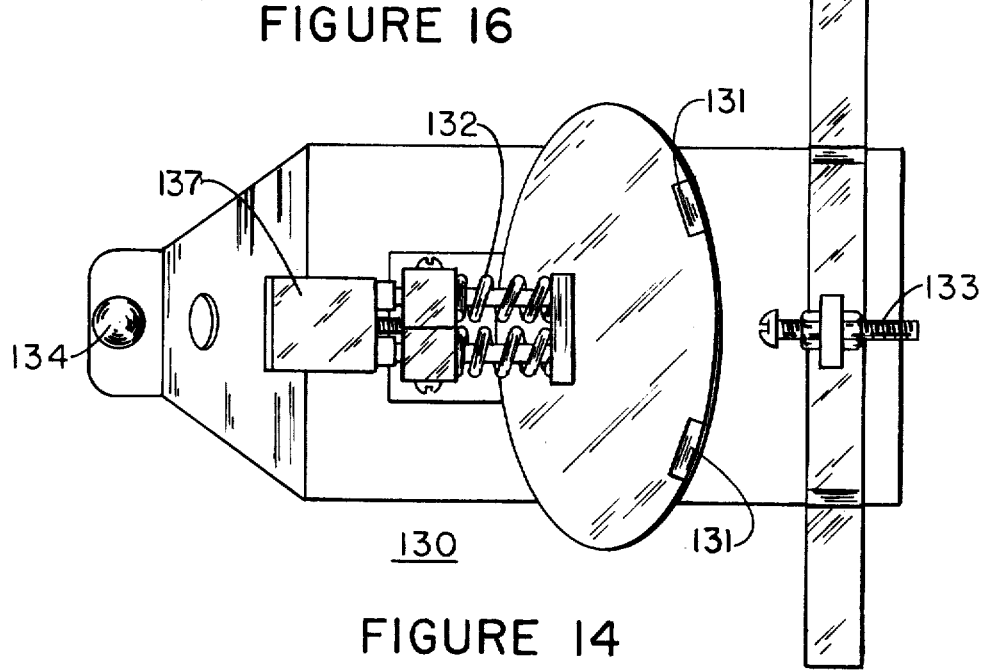
FIGURE 14
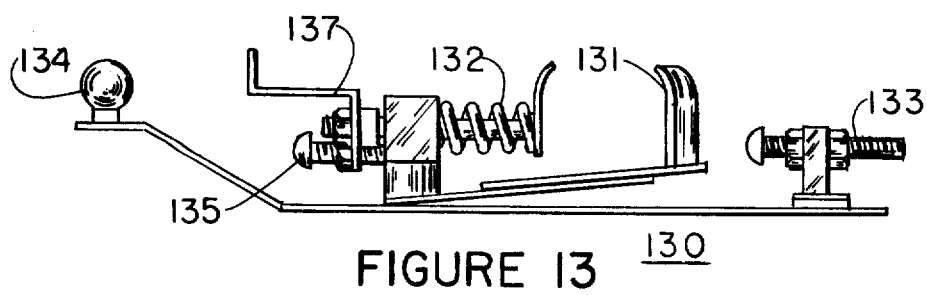
FIGURE 13

MACHINE FOR MARKING BAKED GOODS

BACKGROUND OF THE INVENTION

1. Field of the Invention

This invention relates to marking of baked goods and more particularly to a device for branding a pattern into a baked bun.

2. Description of the Prior Art

Finished baked goods have been marked with patterns formed from icing or food coloring. Attempts have been made to mark goods with patterns before they are baked and then baking the goods to set or reveal the pattern. Marking baked goods before baking has not been satisfactory for providing a clear distinct pattern on the finished baked product. Applicant is unaware of the use of a heating element to mark a baked bun with a distinctive pattern, representative of a sporting item, such as a baseball or football.

SUMMARY OF THE INVENTION

A marking machine is disclosed for branding a selected pattern onto a baked bun. A formed heating element is provided with a branding pattern formed thereon. The branding element is formed from a plurality of sheet metal pieces which are shaped and attached to the heating element. The sheet metal pieces provide a fairly sharp or distinct surface for contacting the baked good. The thin sheet metal pieces which are good heat conductors are heated rapidly with the heating element. When the heating element gets hot the pattern is also at a high enough temperature to mark the bun. The heated pattern is movably supported from a frame. A slidable bun holder is positioned on the frame beneath the heating element. A baked bun disposed in the bun holder, is positioned beneath the heated pattern for marking. The heating element is then lowered bringing the formed branding pieces into contact with the baked bun. The branding elements are kept in contact with the bun for a long enough period of time to mark the bun as desired.

The heating element is supported in a detachable head. A support arm assembly which comprises a movable portion and a stationary portion is utilized for supporting the detachable head from the frame. The head is connected to a vertically disposed movable or sliding rod which is attached, by a support bracket, to a vertical portion of the fixed frame. The movable or sliding rod can be moved up and down to bring the branding pattern into contact with a bun disposed therebeneath. The position of the support bracket on the fixed frame is adjustable. The head is detachably supported to the sliding rod by a plurality of fasteners. Different heads can be provided having different heating elements and different formed branding patterns. The various heads are utilized for marking various baked buns with different distinctive patterns. The movable rod's movement is limited and it can be moved only a selected distance towards the bun holder. An adjustment is provided for changing the movement of the head relative to the stationary portion of the support arm assembly. The adjustment permits the depth to which the branding element penetrates the baked bun, which is to be marked, to be adjusted. Various types of heating elements can be used for changing the temperature of the branding pattern, if desired.

A limit switch is provided which closes when the hot pattern is lowered into contact with the bun. When the limit switch is closed it starts a timer which controls a buzzer. The timer has an adjustable time limit which sounds a buzzer indicating that the selected time has elapsed and the head can be raised.

While the invention is only shown and described for a single manually operated marker it is to be understood that multi-head units and/or automatically controlled units can also be built.

It is an object of this invention to teach a relatively fast and inexpensive method and apparatus for marking a baked bun with a clear and distinctive pattern.

It is a further object of this invention to teach an electric heating element having a formed sheet metal pattern connected thereto which is utilized for marking a baked bun to be representative of a baseball or a football.

BRIEF DESCRIPTION OF THE DRAWINGS

For a better understanding of the invention reference may be had to the preferred embodiments exemplary of the invention shown in the accompanying drawings in which:

FIG. 1 is a right side view of the baked bun marking apparatus according to the teaching of the present invention;

FIG. 6 is a view of the heating element taken in FIG. 1 along the line VI—VI;

FIG. 7 is a side view of the heating element shown in FIG. 6;

FIG. 11 is a view of a branding tab in the flat;

FIG. 12 is a detailed view of one of the sheet metal branding tabs formed into the desired shape for marking a bun as a baseball;

FIG. 13 is a side view of another embodiment of the bun holding tray which is particularly adapted for holding buns to be marked as footballs;

FIG. 14 is a top view of the tray of FIG. 13;

FIG. 15 is a view of a heating element to mark a bun which is representative of a football;

FIG. 16 is a side view of a portion of the heating element of FIG. 15;

FIG. 17 is a section view of the heating element of FIG. 15 along the line XVII—XVII;

FIG. 18 is a detailed view of one of the branding elements of FIG. 15; and,

FIG. 19 is a view of the branding element of FIG. 18 in the flat.

DESCRIPTION OF THE PREFERRED EMBODIMENT

Figure 2:
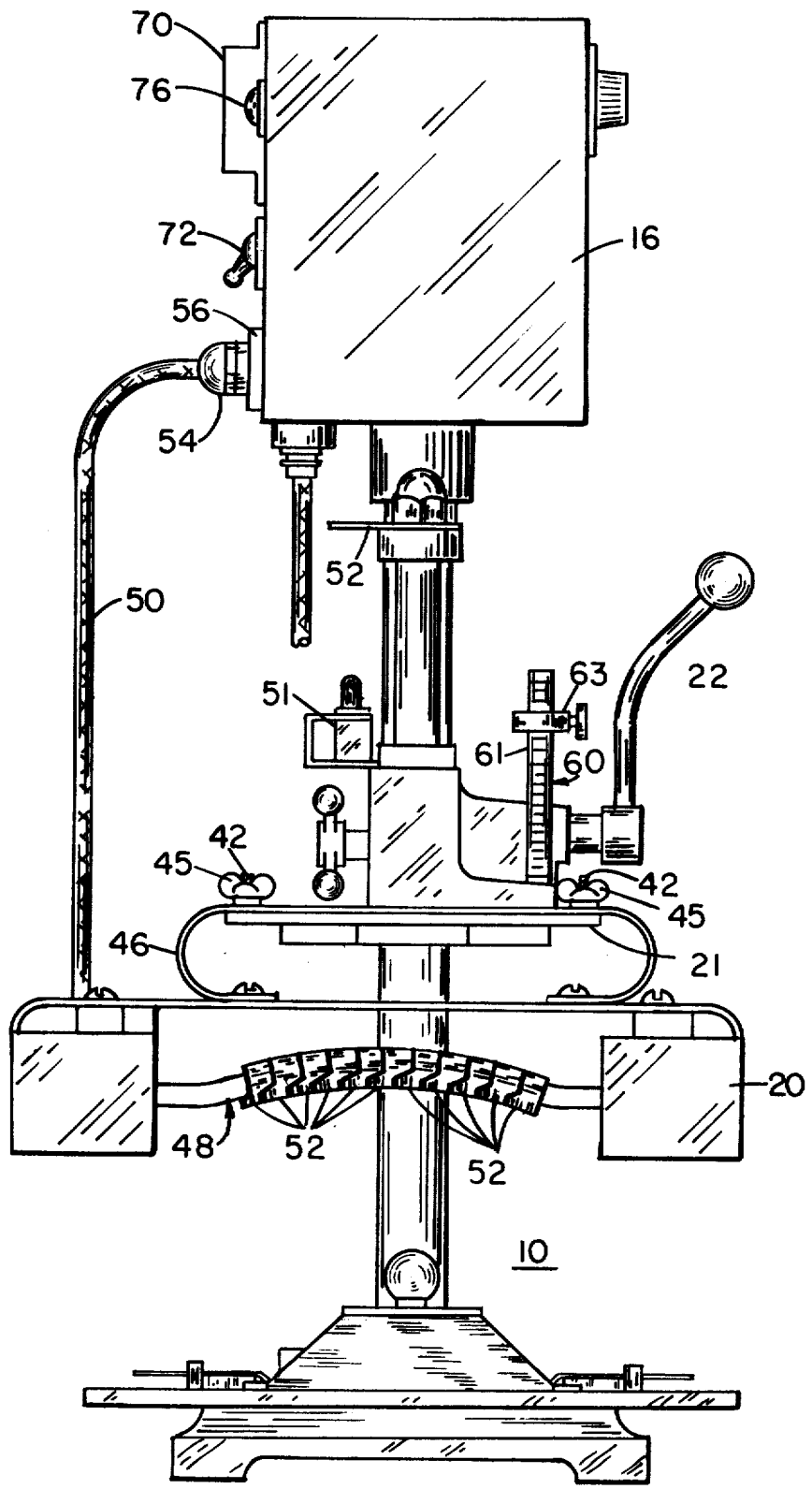
FIG. 2 is a front elevation view of the baked bun marker shown in FIG. 1.
Figure 3:
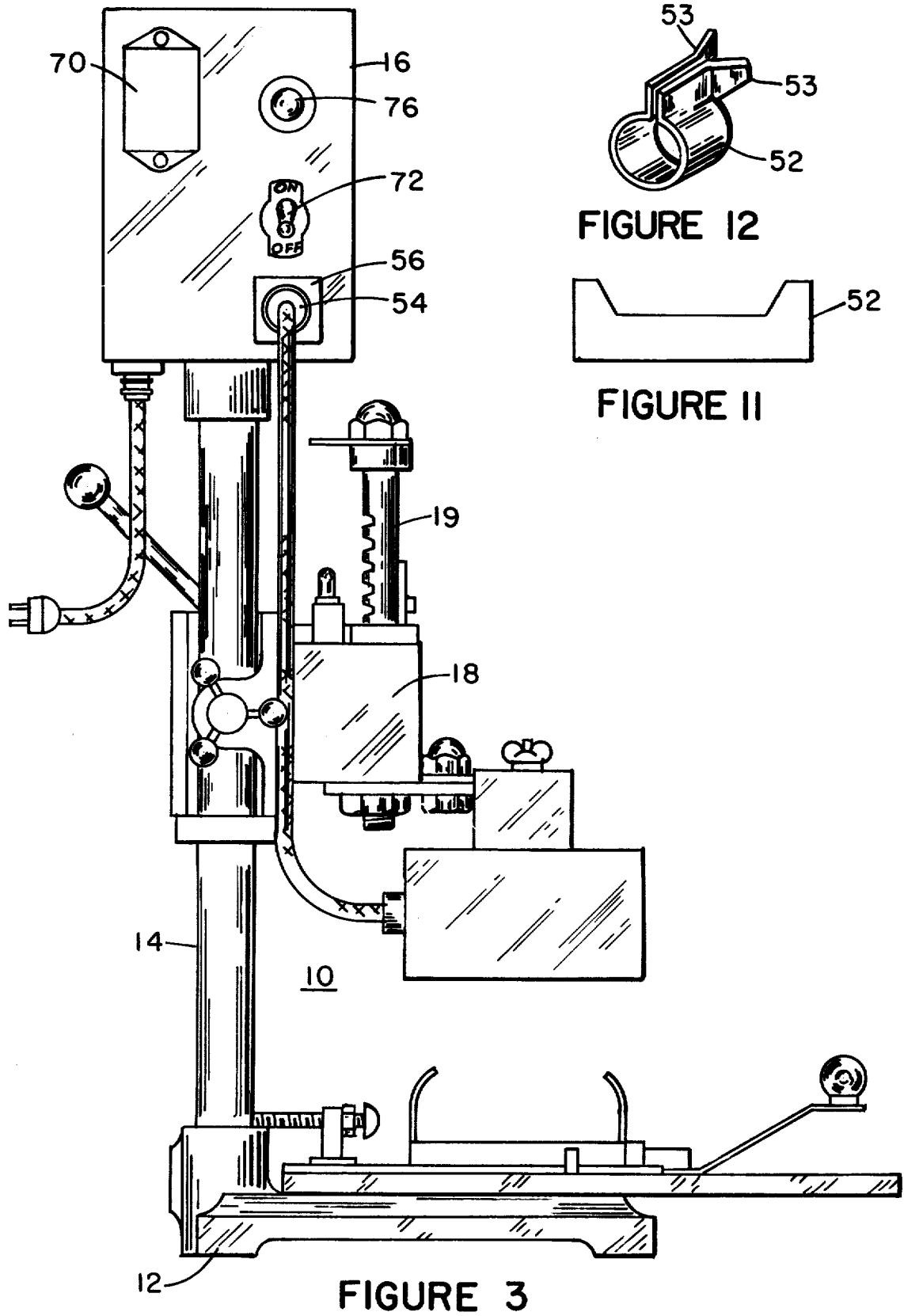
FIG. 3 is a left side view of the baked bun marking apparatus shown in FIG. 1.
Figure 4:
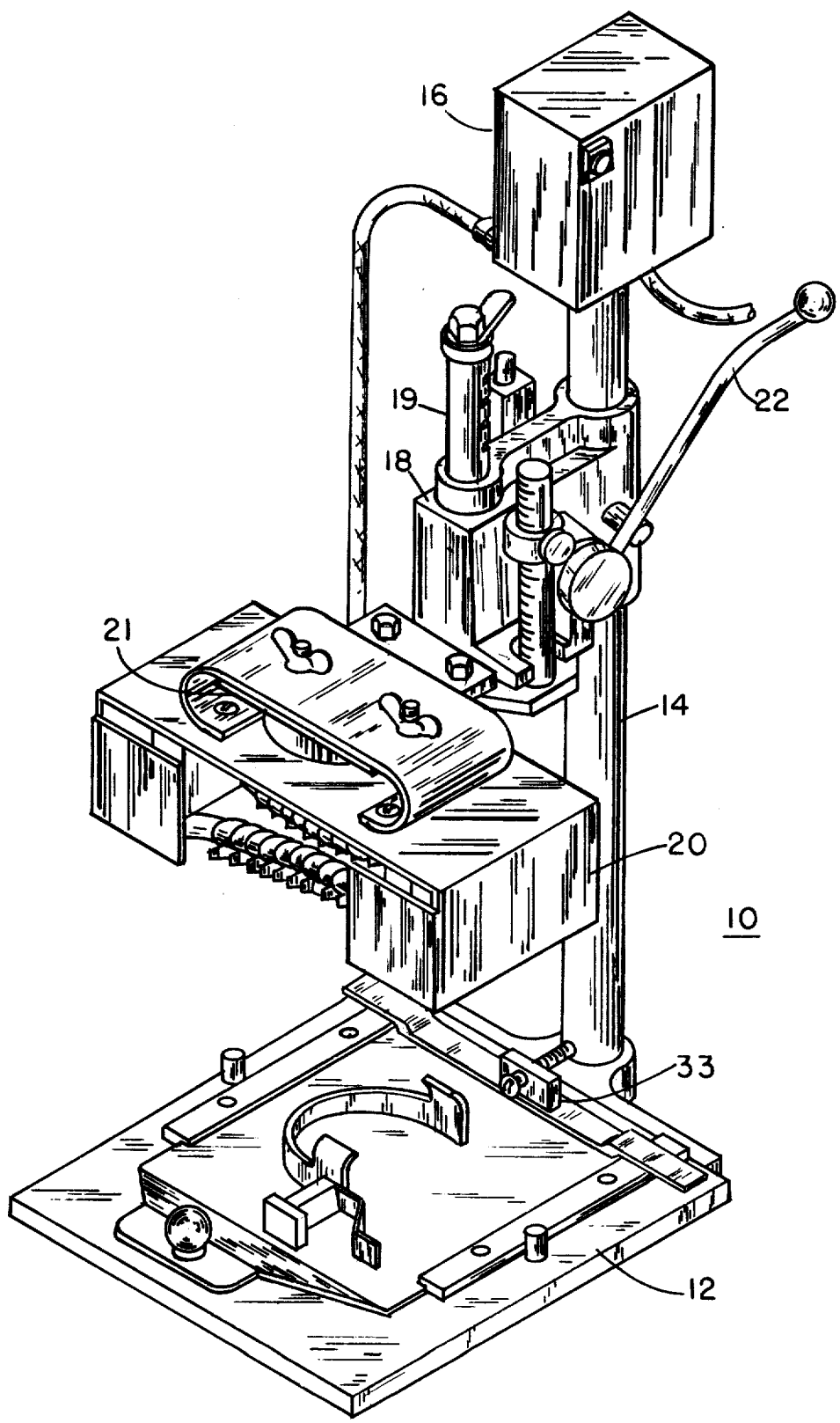
FIG. 4 is an isometric view of the disclosed bun marker.

Referring now to the drawings there is shown a bun marking apparatus 10 which is utilized for branding a selected pattern into a baked bun. The bun marking apparatus 10 consists of a fixed base 12 having an upward vertical column 14 extending therefrom. A control operating box 16 is mounted at the top of vertical column 14. An arm assembly 18 which has a movable portion and a stationary portion is fastened at a selected position to vertical column 14. A bun branding head 20 is detachable connected to a movable shaft 19 which forms a part of arm assembly 18. A lever 22 is provided which when rotated, through appropriate gearing, raises or lowers shaft 19. Lever 22 is spring biased to return shaft 19 to a raised position when released. Detachable head 20 is held by fasteners to a plate 21 which is connected move with to the lower end of shaft 19. A slidable tray 30 is provided for holding baked buns which are to be marked.

Tray 30 includes an adjustable bun gripping device 32 which grips a bun positioned therein. Tray 30 also includes a handle 34 which is utilized for moving tray 30. Tray 30 lies beneath bun branding head 20 and is held in place by guides 36 which are attached to base 12. An operator can thus move a bun held by tray 30 back and forth on base 12 for positioning during bun marking. An adjustable stop 33 is provided for limiting rearward movement of tray 30. When tray 30 is stopped by stop 33 it should be in the proper position for marking a bun.

Bun branding head 20 is detachable connected to plate 21 which is formed as part of the linear movable portion of arm assembly 18. Plate 21 includes two upward extending threaded studs 42 which are adapted to pass through mating holes formed in a bracket 46 which forms the top of branding head assembly 20.

Heating element 48 is supported within bun branding head 20. Electrical connections 50 connect heating element 48 to control box 16 and are utilized for conducting electrical current to heating element 48 so that it is heated to the desired temperature. Sheet metal branding tabs 52 are connected in good thermal contact with heating element 48 and extend therefrom. Branding tabs 52 are heated by conduction when heating element 48 is energized. Branding tabs 52, provided on heating element 48, are formed to burn a distinctive pattern into the baked bun which they contact.

Figure 8:
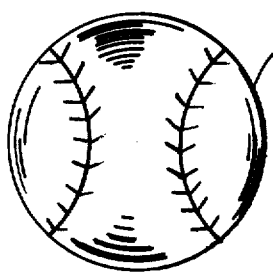
FIG. 8 is a baked bun marked with the marking apparatus of the present invention to be representative of a baseball.
Figure 9:
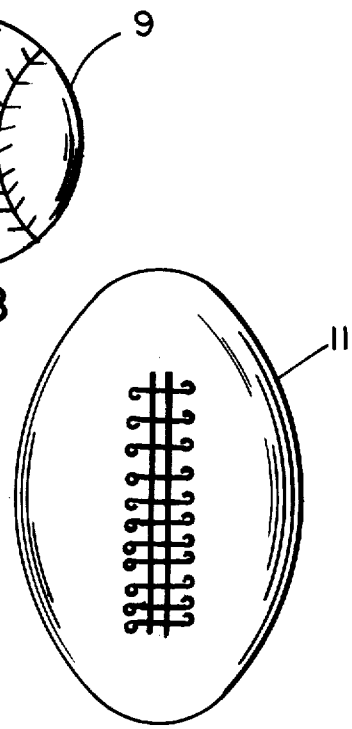
FIG. 9 is a top view of a baked bun marked with the apparatus of the present invention to be representative of a football.
Figure 10:
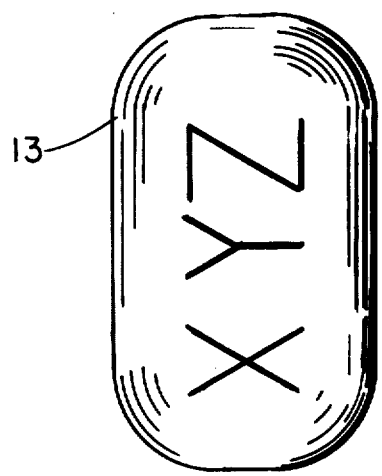
FIG. 10 is a top view of a bun marked with a selected distinctive pattern.
Figure 5:
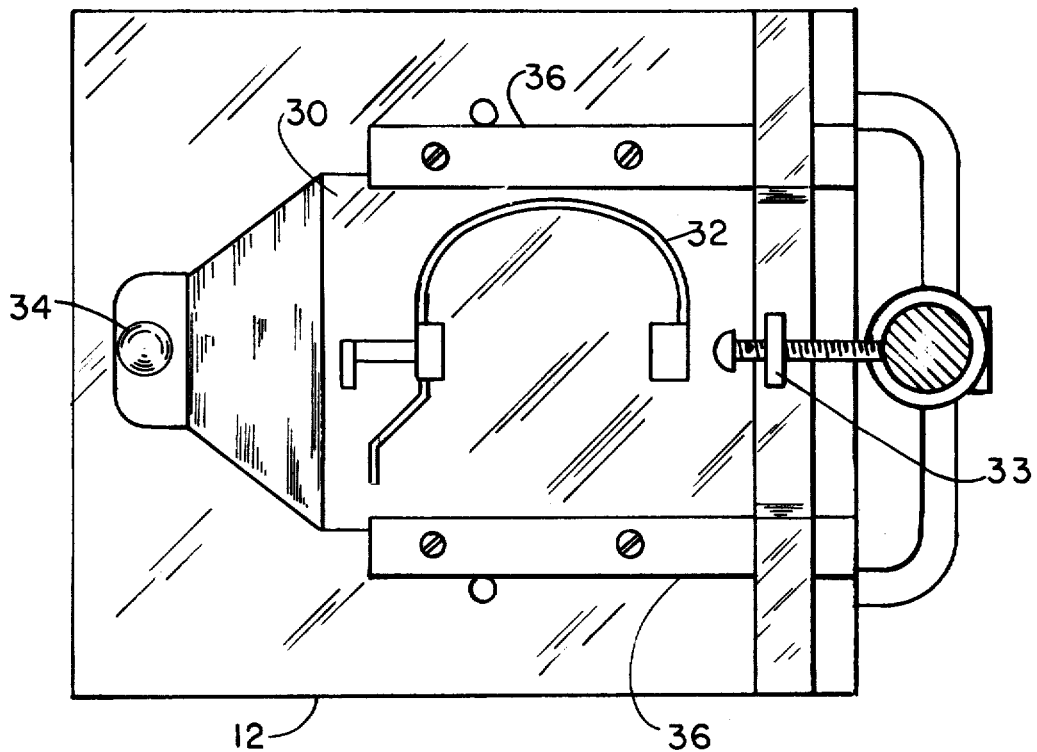
FIG. 5 is a view in FIG. 1 along the line V—V showing the base and sliding bun holding tray.

FIG. 8 shows a baked bun 9 marked to represent a baseball. The heating element shown in FIGS. 6 and 7 is formed to mark a bun like a baseball, as shown in FIG. 8. Branding head 20 is held to bracket 21 by wing nuts 45. A plug 54 is provided on the end of the electrical conductors 50 to plug into receptacle 56 which is formed on control box 16. Other removal heads can be provided for marking baked buns with other desired patterns. Branding head 20 can be quickly and easily removed by removing wing nuts 45 and unplugging plug 54. FIG. 9 illustrates a football bun 11 and FIG. 10 illustrates a letter marked bun 13 which can be obtained with the proper head 20.

The distance of movement of plate 21 which forms a part of support arm assembly 18 is adjustable. An adjustable stop 60 is provided for adjusting the movement of the plate 21 bracket on support arm assembly 18. Operating lever arm 22, through a rack and pinion assembly, can position shaft 19 and the supported bun branding head 20. The adjustable stop 60 is set to vary the depth of penetration of the formed branding elements 52 into bun 9. Stops 60 can change the depth of the branded pattern. The downward movement of the head 20 toward bun holder 30 is limited by stop 60.

Stop 60 includes a vertical shaft 61 which moves with head 20. A stop collar 63 is connected to vertical shaft 61. Stop collar 63 engages the fixed portion of arm assembly 18 when branding head 20 is lowered, limiting downward movement. Collar 63 is adjustable on shaft 61 to vary the travel of shaft 19 and the unitarily movable head 20.

Limit switch 51 is disposed to be activated by member 52 when branding head 20 is lowered. Switch 51 controls operation of a timer disposed within control box 16. An adjustment knob 58 is provided for selecting a timed interval limit of 0 to 10 seconds. When the selected time elapses a buzzer 70 is activated. This provides an audible signal to the operator which indicates that a selected time has elapsed. The operator can use this timer period for judging when marking of the bun is complete. A power ON switch 72 is turning on the power to control box 16 when the power plug 74 is connected to an appropriate ac supply. A white indicating light 76 indicates when power is on to bun marking apparatus 10.

During operation the heating element 48 is allowed to heat to a sufficient temperature to heat branding elements 52 hot enough to mark a baked bun 9. A bun 9 is then positioned on slide 30 beneath branding head 20, which is attached to bracket 21. Lever arm 22 is then pulled forward to move the branding head 20 so that heated tabs 52 engage and burn a pattern into the baked bun 9. The arm 22 is spring biased to an up position so that the branding head raises when this arm is released. The disclosed apparatus provides for fast and inexpensive marking of baked buns with a clear distinct pattern.

Branding tabs 52, as shown in more detail in FIGS. 11 and 12 are formed from sheet metal which is cut into the desired shape and secured in good heat conducting fashion to heating element 48. Tabs 52 are cut in the flat and bent around heat element 48. They are then brazed or welded to tightly engage heating element 48. The outward extend portions 53 are then spaced apart. By fitting a series of tabs 52 on a shaped heating element 48 a branding pattern representative of a baseball can be formed.

If desired bun marking machine 10 can be formed with a plurality of marking heads 20 for marking more than one bun at a time. Also, while the machine shown is manually operated it can easily be made to operate from a motor which would position head 20. The time of marking can be controlled through an appropriate limit switch and timer arrangement.

FIGS. 13 and 14 show a bun grip tray 130 which is particularly suitable for gripping a bun which is to be marked to be representative of a football. Use of tray 130 is similar to use of tray 30 which was previously described. Tray 130 includes a handle 132 and an adjustable bun gripping device 132. Gripper 132 is spring biased towards tabs 131 and hold a bun, similar to the one shown in FIG. 9, therebetween. The position of gripper 132 can be adjusted by positioning of bolt 135. Handle 137 is moved away from tabs 131 when placing a bun in gripper assembly 132. A stop 133 is provided on tray 130.

FIGS. 15 through 19 show details of a branding element 148 which is intended for marking a bun representative of a football, as shown in FIG. 9. Branding tabs 152 are formed and tightly attached to a heating rod 147. Branding tabs 152 make good thermal contact with heating rod 147 and are heated thereby. Various other shapes of tabs 152 can be formed for branding different patterns.

What is claimed is:

1. A machine for marking a baked bun comprising:
   an electric heating element;
   a formed heat conducting pattern connected to said electrical heating element to be heated thereby;
   a detachable head supporting said heating element and said formed pattern;
   bun receiving means for holding a baked bun;
   bun positioning means for moving said bun receiving means beneath said formed pattern;
   a supporting arm having said head connected thereto and being movable between a position wherein said formed pattern contacts said bun and a position wherein said formed pattern is spaced apart from said bun;
   supporting arm position adjusting means for adjusting the depth of penetration of said pattern into said bun when said formed pattern moves into contact with said bun; and,
   an adjustable timer which is activated when said formed pattern moves into contact with said bun.

2. A machine for marking a baked bun as claimed in claim 1 wherein:
   said formed pattern is constructed to mark bun to resemble a baseball.

3. A machine for marking a baked bun as claimed in claim 1 wherein:
   said formed pattern is constructed to mark the bun to resemble a football.

4. A baked bun marking device comprising:
   a frame;
   means for holding said baked bun;
   an electrically heated element formed into a selected shape;
   positioning means mounted on said frame and operatively connected to said heated element for moving said electrically heated element between a first position spaced apart from said baked bun held by said holding means and a second position in contact with said bun by said holding means;
   means operatively connected to said electrically heated element for limiting the penetration of said element into said baked bun as said element comes into contact therewith; and
   a timer which is activated when said heated element contacts a bun held by said bun holding means.

* * * * *